United States Patent [19]
Bellmer

[11] 3,811,468
[45] May 21, 1974

[54] COMPRESSOR VALVE ASSEMBLY

[75] Inventor: Friedrich O. Bellmer, Stanhope, N.J.

[73] Assignee: Fedders Corporation, Edison, N.J.

[22] Filed: June 8, 1973

[21] Appl. No.: 368,350

Related U.S. Application Data

[63] Continuation-in-part of Ser. No. 233,560, March 10, 1972, abandoned.

[52] U.S. Cl........ 137/512.15, 137/525.3, 137/525.5
[51] Int. Cl............................................. F16k 15/14
[58] Field of Search........... 137/525.1, 525.3, 525.5, 137/512.15, 512.4; 417/565, 567, 569, 571

[56] References Cited
UNITED STATES PATENTS

| | | | |
|---|---|---|---|
| 978,152 | 12/1910 | Gutermuth | 137/525.3 |
| 3,568,712 | 3/1971 | Rinehart | 137/525.3 |
| 2,599,499 | 6/1952 | Thorstenson | 137/525.3 X |
| 756,869 | 4/1904 | Mansfield | 137/525.3 |
| 1,637,821 | 8/1927 | Heideman | 137/525 |
| 1,672,125 | 6/1928 | Heideman | 137/525 |
| 2,065,062 | 12/1936 | Dugelay | 137/512 |
| 2,118,356 | 5/1938 | Money | 137/525.5 |

*Primary Examiner*—William R. Cline
*Attorney, Agent, or Firm*—Ryder, McAulay, Fields, Fisher & Goldstein

[57] ABSTRACT

A valve chamber in a compressor housing is formed by opposing walls, one of which has a port formed therein for allowing gas to enter the valve chamber. A resilient U-shaped reed is disposed between the opposed walls, said reed having a first end portion adapted to cover the port and a second end portion which is held stationary against the wall opposite the port. A backer plate is positioned between the first and second end portions to intercept the movement of the first end portion and limit the flexure of the reed.

12 Claims, 6 Drawing Figures

3,811,468

PATENTED MAY 21 1974

COMPRESSOR VALVE ASSEMBLY

IN RELATIONSHIP TO OTHER APPLICATIONS

The present application is a continuation-in-part of U.S. Pat. application Ser. No. 233,560 now abandoned.

BACKGROUND OF THE INVENTION

1. Field of the Invention

The present invention relates to compressor valve assemblies and more particularly to an assembly including a reed type valve having backer plates to limit valve flexure.

2. Description of the Prior Art

Heretofore, reed type valves have been used extensively in compressors, primarily because of their compact and simple structure. The use of reed type valves greatly reduced the overall cost of compressors. However, modern technology demanded larger compressor capacity from the same physical size compressors. As a result of this demand, rotary compressors were developed for high-speed operation to achieve the required capacity. To facilitate high-speed operation, it was essential that a fast acting, highly resilient valve be used.

To obtain the desired resilience in a reed valve, the valve length was increased; however, this required larger size compressors which were not desirable for many applications. Small compact compressors required short reed valves. The short reed valves were too stiff and did not open enough to allow a sufficient volume of gas to pass from the cylinder of the compact high-speed compressors without overstressing the valves.

In order to overcome this difficulty, a folded type of reed valve was designed to provide greater flexibility. Examples of such valve assemblies are shown in U.S. Pat. Nos. 1,672,125; 1,637,821 and 2,106,236. This type of folded or reversely bent reed type valve provided greater flexibility and thus, increased compressor capacity. However, it was discovered that the flexible reed type valve could not withstand liquid slugging as liquid refrigerant or lubricant passed through the port and valve assembly.

In an attempt to protect the valve from excessive flexure and damage resulting from liquid slugging, backer plates were developed to limit valve flexure. Examples of such backer plates are shown in U.S. Pat. Nos. 2,065,062 and 2,118,356. The prior art valve assemblies utilized backers that were attached to the reed valves and compressor housings at positions adjacent the input port. This configuration resulted in the same problem that was experienced with the flat reed type valves, namely lack of flexibility. Thus, all the devices heretofore provided with backers had limited flexibility, which resulted in limited compressor capacity.

SUMMARY OF THE INVENTION

The present invention contemplates a valve assembly comprising three components, a valve, a valve chamber and a backer. The valve is a folded type reed valve having first and second end portions and a U-shaped portion connecting the end portions to provide an elongated flexible portion so that considerable flexibility is achieved. The second end portion is held stationary against a wall of the compressor valve chamber while the first end portion is positioned to normally cover a port formed in another wall of the valve chamber. The first end portion is free to move away from and uncover the port when pressure is exerted on the portion.

The backer is an independent component that may be attached to the valve or may be placed in abutment with the valve. The backer functions to limit the flexure of the reed valve and protects the valve from potential damage that could result from liquid slugging. The backer is generally forked shaped having a bifurcated portion that extends on each side of the U-shaped portion of the reed valve. A central portion of the backer is positioned to intercept the first end portion of the reed valve thereby preventing excessive flexure and damage. The central portion of the backer has downturned legs and feet that abut against the second end portion of the reed valve which is opposite the first end portion. The feet of the backer hold the second end portion stationary, thereby positioning the reed valve relative to the compressor valve chamber.

The primary objective of the present invention is to provide a valve assembly including an inexpensive and compact reed type valve for a compressor.

Another objective of the present invention is to provide a reed type valve that will facilitate increased compressor capacity while not being subject to damage resulting from liquid slugging. The foregoing objectives and advantages of the invention will appear more fully hereinafter from a consideration of the detailed description which follows, taken together with the accompanying drawings, wherein several embodiments of the invention are illustrated by way of example. It is to be expressly understood, however, that the drawings are for illustrative purposes only and are not to be construed as defining the limits of the invention.

DESCRIPTION OF THE INVENTION

Figure 1:
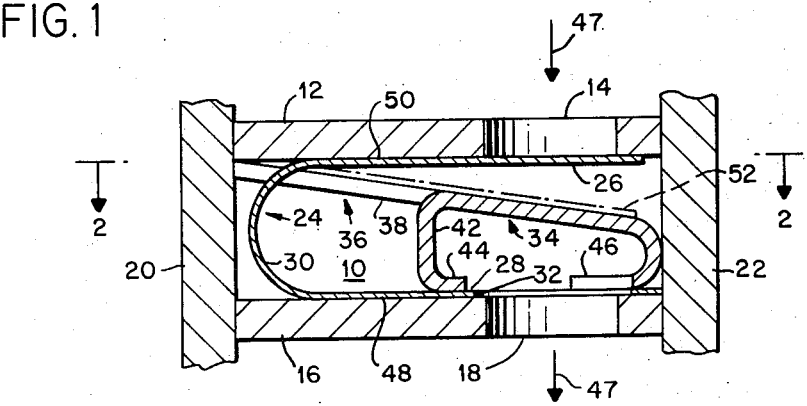
FIG. 1 shows a vertical section, taken along line 1—1 of FIG. 2, of a valve constructed in accordance with the present invention.
Figure 2:
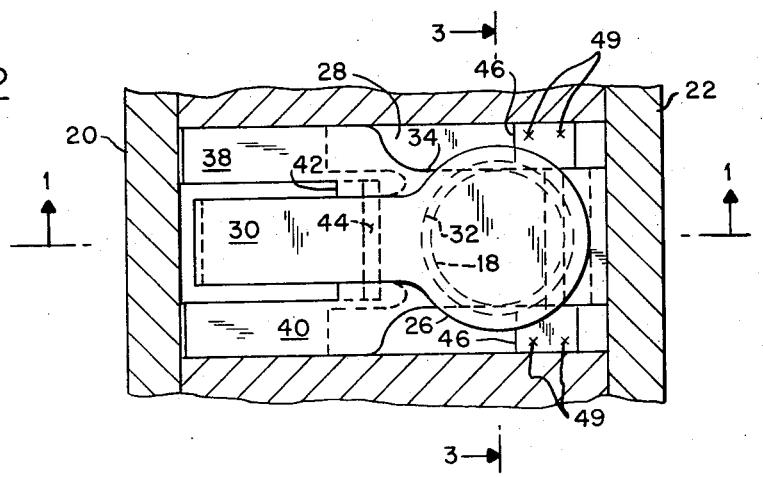
FIG. 2 shows the valve of FIG. 1, taken along line 2—2 of FIG 1.
Figure 3:
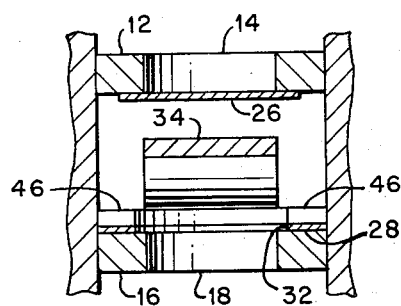
FIG. 3 shows a valve constructed in accordance with the present invention taken along line 3—3 of FIG. 2.

Referring to FIGS. 1, 2 and 3, there is shown a preferred embodiment of the present invention. A valve chamber 10 having a rectangular cross section is formed by two pairs of parallel walls 12 and 16. Wall 12 is part of a cylinder of a compressor and has a discharge port 14 formed therein for discharging pressurized gas from the compressor cylinder. Wall 16 is positioned parallel to wall 12 but spaced therefrom and has a port 18 formed therein in substantial alignment with port 14. Parallel end plates 20 and 22 complete the rectangular shaped valve chamber 10.

A U-shaped reed type valve 24 is disposed between walls 12 and 16. Valve 24 is made of a thin, flexible metallic sheet material having a high resilience, such as spring steel. Valve 24 has a first end portion 26, a second end portion 28 and a curved portion 30 positioned midway the first and second end portions. First end portion 26 terminates in a circular area adapted to completely cover port 14 when end portion 26 is seated against wall 12. The second end portion 28 terminates in a rectangular shaped portion that engages the inner surface of wall 16 and has a circular opening 32 in axial alignment with port 18. End portions 26 and 28 are compressed prior to being placed between walls 12 and 16 so that the restoring force of the reed valve 24 holds end portion 26 in a seated position over port 14.

A valve backer 34 is positioned between end portions 26 and 28 so as to intercept end portion 26 and limit the angle through which the valve may flex. Backer 34 has a bifurcated portion 36 having branches 38 and 40 disposed on each side of curved portion 30 and having ends contacting the inner surface of wall 12. Backer 34 has a downwardly disposed leg 42 with a foot 44 for engaging end portion 28. The end of backer 34 is reversely bent to form a horizontal extension 46 which is spot welded at 49 to end portion 28 of valve 24 so that curved portion 30 of valve 24 does not engage the bifurcated branches 38 and 40 of the bifurcated portion 36 of backer 34.

End portion 26 normally covers port 14 because the restoring force of reed valve 24 urges end portion 26 into a seated position over port 14. When the compressor is delivering pressurized gas, a force in the direction of arrows 47 is exerted on end portion 26. The force causes reed valve 24 to flex between positions 48 and 50 so that end portion 26 engages backer 34 as shown by dotted line 52.

The valve assembly as shown in FIG. 1 has the advantages of the folded or reversely bent type of reed valves and also the advantages of the prior art valves that included backers. Since the valve is permitted to bend over a greater length because of the folded structure, greater resiliency is achieved thereby allowing for larger compressor capacity. The possibility of damage resulting from excessive flexure of the valve is eliminated by the unique use of backer plate 34 disposed between end portions 26 and 28 to intercept end portion 26 and thereby limit the flexure of valve 24. Thus, the present invention overcomes the major problems of the valves provided by the prior art and provides a simple and compact structure for a valve which may be readily used in small, compact compressors.

Figure 4:
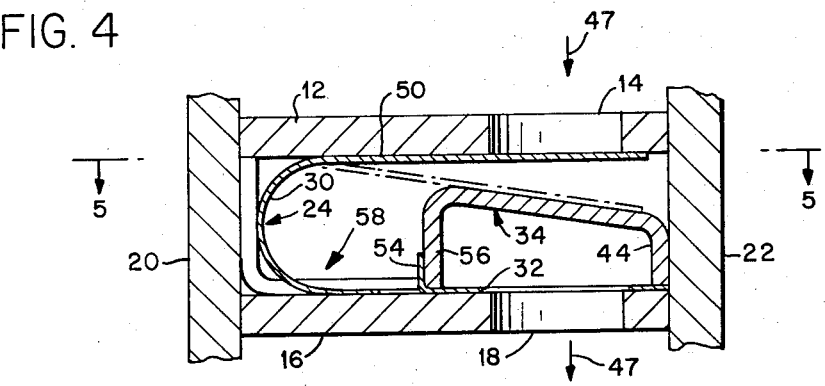
FIG. 4 shows a vertical section of another embodiment of a valve constructed in accordance with the present invention.
Figure 5:
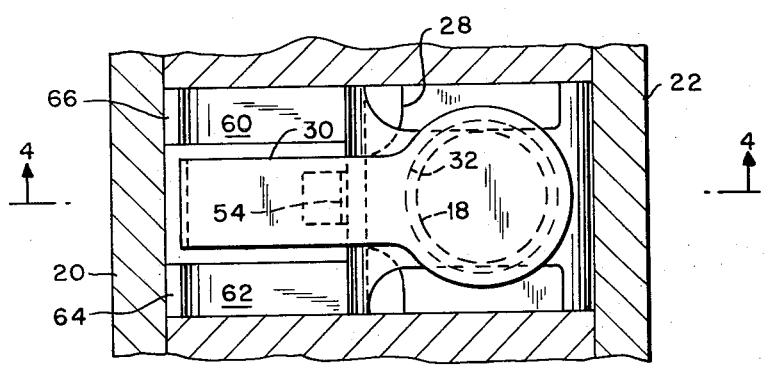
FIG. 5 is a view taken along line 5—5 of FIG 4.

Referring to FIGS. 4 and 5, there is shown a second embodiment of the present invention which functions in a manner similar to that of the previously described embodiment, except that the backer 34 is not spot welded to the valve 24. Valve 24 has a raised portion 54 forming a tongue, which engages a downwardly extending leg 56 of the backer 34 to properly orient the valve 24 relative to the backer. Backer 34 has a different configuration than the backer shown in FIGS. 1, 2 and 3. The bifurcated portion 58 shown in FIG. 4, has branches 60 and 62 that engage the inner surface of wall 16 and extend on each side of curved portion 30 of reed valve 24 and thereafter terminate in upwardly extending legs 64 and 66 which have ends engaging the inner surface of wall 12. In the embodiment shown in FIGS. 4 and 5, it is not necessary that the backer be spot welded to the reed valve 24, because the tongue 54 properly orients the reed valve relative to the backer and spot welding becomes nonessential.

Figure 6:
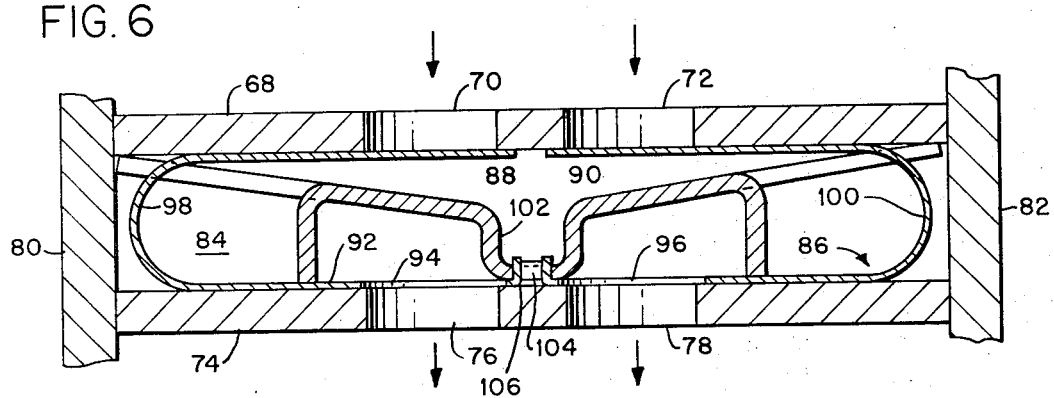
FIG 6 is a vertical section of another embodiment of the invention for use with a compressor having two discharge ports.

Referring to FIG. 6, there is shown an embodiment of the present invention that may be used with compressors having extremely high capacities where it is essential that two discharge ports be used to assure the proper flow of discharge gas.

Cylinder wall 68 has two discharge ports 70 and 72 formed therein. A second wall 74 parallel to wall 68 and spaced therefrom has ports 76 and 78 formed therein and positioned in axial alignment with ports 70 and 72. End plates 80 and 82 abut against walls 68 and 74 to form a rectangular valve chamber 84 in which a valve assembly is disposed.

A reed valve 86 having an oval cross section is disposed within valve chamber 84 and has end portions 88 and 90 which normally close ports 70 and 72. Reed valve 86 has a rectangularly shaped portion 92 that engages the inner surface of wall 74 and has circular openings 94 and 96 formed therein and positioned in axial alignment with ports 76 and 78. Reed valve 86 also has circular portions 98 and 100 disposed between end portions 88 and 90 and rectangular portion 92, respectively. Curved portions 98 and 100 provide additional length over which reed valve 86 may flex and therefore provide the resiliency required of the present invention.

A valve backer 102 is positioned between the rectangular portion 92 of reed valve 86 and the end portions thereof and has two upwardly sloping sides for intercepting the end portions of the reed valve and limiting the flexure of the curved portions of the reed valve. Backer 102 has a pair of bifurcated portions that are similar to the bifurcated portions 36 of the backer shown in FIG. 1. The central portion of backer 102 has an opening 104 formed therein for receiving upwardly extending tongues 106 formed as part of reed valve 86. Tongues 106 properly orient the backer relative to the reed valve and eliminate the necessity for spot welding the backer to the valve.

Thus, the embodiment shown in FIG. 6 provides a valve assembly for compressors requiring greater capacity than is available from valve assemblies as shown from FIGS. 1 and 4. The curved portions 98 and 100 provide a greater length over which the valves may bend and therefore, provide the proper resilience required of the valve assembly. Backer plate 102 intercepts the end portions of the valve 86 to prevent overflexing the valve and destruction thereof.

For compressors with high capacities where two discharge ports are required, two single valve assemblies may be used instead of using a double valve as shown in FIG. 6. Two valves similar to the type shown in FIGS. 1–5 can be installed in line with the discharge ports in valve chamber 84 of FIG. 6.

Thus, the present invention provides a simple valve assembly that is both compact and inexpensive that may be used with small, high speed, high capacity compressors. The present invention provides a backer for intercepting the end portion of the valve and thereby prevents damage resulting from overflexure of the reed valve or from liquid slugging.

What is claimed is:

1. A compressor valve assembly for opening and closing a port formed in a compressor housing comprising:

a valve chamber in said housing, said chamber including a first wall containing said port and a second wall containing an opening therein;

a folded resilient reed having first and second end portions and a curved portion therebetween, said reed being formed and arranged so that the first end portion seats on said first wall to close said port, the second end portion seats on said second wall and the curved portion is adapted to flex so that the first end portion moves in a direction away from said first wall and towards said second wall to open said port;

means for holding the second end portion stationary;

a seperable backer plate disposed to intercept the movement of said first end portion thereby limiting the flexure of said curved portion; and, means for holding the backer plate stationary.

2. A compressor valve as described in claim 1 wherein the means for holding the second end portion stationary and the means for holding the backer plate stationary comprises said chamber, which includes, in addition to said first wall and said second wall at least a third wall formed at right angles to said first and second walls at a point remote from said port, said backer plate engaging the second wall at at least two positions and the third wall at a position remote from the port.

3. A compressor valve as disclosed in claim 1 wherein the backer plate is disposed between said first and second end portions.

4. A compressor valve as described in claim 3 wherein the backer plate engages the second end portion to hold the second end portion stationary.

5. A compressor valve as described in claim 4 wherein the backer plate is attached to the second end portion of the reed.

6. A compressor valve as described in claim 4 wherein the second end portion of the resilient reed has a tongue formed thereon for engagement with a groove formed in the backer plate.

7. A compressor valve as described in claim 1 wherein the first end portion and the backer plate each have a flat surface, the flat surface of the backer plate being disposed at an angle with respect to said first end portion so as to intercept the flat surface of the first end portion when the curved portion flexes through a predetermined maximum angle.

8. A compressor valve as described in claim 1 wherein the first end portion is enlarged to cover an enlarged port.

9. A compressor valve as described in claim 1 wherein the resilient reed has a U-shaped cross section.

10. A compressor valve as described in claim 1 wherein the second end portion extends beyond the first end portion and has a curved portion so that the second end portion returns to a position adjacent the first end portion, said second end portion being formed and arranged to seat on said compressor housing and to close a second port formed therein, said second curved portion is adapted to flex in a direction away from said housing to open said second port and the backer plate also disposed to intercept the movement of said second end portion.

11. A compressor valve as described in claim 1 wherein the backer plate has a central portion disposed between said first and second end portions and a bifurcated portion extending on each side of the curved portion of the reed so as to engage the valve chamber.

12. A compressor valve as described in claim 11 wherein the backer plate engages the second end portion for holding the second end portion stationary.

* * * * *